United States Patent
Masucci

(10) Patent No.: US 9,738,258 B2
(45) Date of Patent: Aug. 22, 2017

(54) METHOD OF MANAGING AN ELECTRONIC CONTROL UNIT OF AN AUTOMOBILE THROUGH AN INTEGRATED FINGERPRINT RECOGNITION SYSTEM

(71) Applicant: Lauren Catherine Masucci, Staten Island, NY (US)

(72) Inventor: Lauren Catherine Masucci, Staten Island, NY (US)

( * ) Notice: Subject to any disclaimer, the term of this patent is extended or adjusted under 35 U.S.C. 154(b) by 20 days.

(21) Appl. No.: 15/053,962

(22) Filed: Feb. 25, 2016

(65) Prior Publication Data

US 2016/0244023 A1    Aug. 25, 2016

Related U.S. Application Data

(60) Provisional application No. 62/120,505, filed on Feb. 25, 2015.

(51) Int. Cl.
| | |
|---|---|
| *G06F 7/00* | (2006.01) |
| *B60R 25/25* | (2013.01) |
| *B60R 25/04* | (2013.01) |
| *G07C 9/00* | (2006.01) |

(52) U.S. Cl.
CPC ............ *B60R 25/252* (2013.01); *B60R 25/04* (2013.01); *G07C 9/00563* (2013.01)

(58) Field of Classification Search
CPC ........ B60R 25/252; B60R 25/04; G07C 5/008
USPC .......................................................... 701/36
See application file for complete search history.

(56) References Cited

U.S. PATENT DOCUMENTS

| | | | | | |
|---|---|---|---|---|---|
| 5,933,515 | A * | 8/1999 | Pu | ...................... | G06K 9/00006 340/5.53 |
| 6,100,811 | A * | 8/2000 | Hsu | .................... | B60H 1/00642 340/426.36 |
| 6,225,890 | B1 * | 5/2001 | Murphy | ................ | B60R 25/012 307/10.5 |
| 7,239,227 | B1 * | 7/2007 | Gupta | .................... | B60R 25/25 340/5.81 |
| 7,279,806 | B2 * | 10/2007 | Hale | ................... | B60R 25/2009 307/10.4 |
| 2003/0209893 | A1 * | 11/2003 | Breed | ...................... | B60J 10/00 280/735 |
| 2005/0190039 | A1 * | 9/2005 | Aoyama | ............. | B60R 11/0264 340/5.21 |
| 2006/0186987 | A1 * | 8/2006 | Wilkins | ................ | B60R 25/252 340/5.53 |

(Continued)

*Primary Examiner* — Harry Oh

(57) ABSTRACT

A method of managing an electronic control unit of an automobile through an integrated fingerprint recognition system is implemented between a vehicle and at least one driver. The driver is considered as a user profile within the system and can include a primary designation or a secondary designation. The primary designation is allowed to fully control a plurality of vehicular controllers through the system while the secondary designation is allowed to partially control the vehicular controllers. The vehicular controllers include an entry system, an ignition system, a speed control system, a GPS, and a security system as each of the vehicular controllers is activated or implemented by a fingerprint image of the driver that is stored within an onboard computer of the vehicle. The onboard computer also communicably connected with a mobile device of the driver to complete the system between the driver and the vehicle.

12 Claims, 15 Drawing Sheets

(56) References Cited

U.S. PATENT DOCUMENTS

| | | | | |
|---|---|---|---|---|
| 2007/0239992 | A1* | 10/2007 | White | B60K 28/063 |
| | | | | 713/186 |
| 2010/0148923 | A1* | 6/2010 | Takizawa | B60R 25/2018 |
| | | | | 340/5.82 |
| 2014/0156149 | A1* | 6/2014 | Feit | B60R 25/252 |
| | | | | 701/49 |
| 2014/0218170 | A1* | 8/2014 | Felkins | G06F 21/32 |
| | | | | 340/5.82 |
| 2015/0067827 | A1* | 3/2015 | Lim | G06F 21/32 |
| | | | | 726/19 |
| 2015/0095158 | A1* | 4/2015 | Nasserbakht | G06Q 10/109 |
| | | | | 705/14.58 |
| 2015/0203125 | A1* | 7/2015 | Penilla | G06F 21/445 |
| | | | | 701/1 |
| 2015/0319294 | A1* | 11/2015 | Sudhir | H04M 1/72577 |
| | | | | 455/411 |
| 2015/0371073 | A1* | 12/2015 | Cho | G06F 3/0488 |
| | | | | 382/124 |
| 2016/0027292 | A1* | 1/2016 | Kerning | G08B 25/10 |
| | | | | 455/404.2 |

* cited by examiner

METHOD OF MANAGING AN ELECTRONIC CONTROL UNIT OF AN AUTOMOBILE THROUGH AN INTEGRATED FINGERPRINT RECOGNITION SYSTEM

The current application claims a priority to the U.S. Provisional Patent application Ser. No. 62/120,505 filed on Feb. 25, 2015.

FIELD OF THE INVENTION

The present invention relates generally to a fingerprint recognition system that is intergraded into vehicular control systems to enable authorized users to regulate various vehicular control systems.

BACKGROUND OF THE INVENTION

Biometric devices such as fingerprint and retinal scanners are increasingly used in a wide range of fields to ensure that only authorized users are able to access or use various spaces, systems, and apparatuses. Most of the existing electronic devices increasingly utilize biometric devices to improve safety features of their respective electronic devices and to protect the personal and/or sensitive information from being accessed by unauthorized personnel. However, the usage of biometric devices in the automobile industry has not improved. Even though the automobile industry uses fingerprint scanners in vehicle entry, ignition, and security systems, the functionality of these fingerprint scanners are not maximized to deliver an efficient system.

The present invention improves and expands upon the existing biometric system of automotive vehicles by using multiple fingerprint scanners to actuate different vehicular controller systems. The vehicular controller system includes the entry system, the ignition system, the security system, the global positioning system (GPS) device, and the speed control systems. The present invention also includes connectivity to mobile devices with applications that may remotely control some of the vehicular controller systems. The present invention can also be customized in relation to different users of the vehicle, wherein a fingerprint image of each user actuates the vehicular controller systems according to pre-programmed constraints.

DETAIL DESCRIPTIONS OF THE INVENTION

All illustrations of the drawings are for the purpose of describing selected versions of the present invention and are not intended to limit the scope of the present invention.

The present invention is a method for managing an electronic control unit of an automobile through an integrated fingerprint recognition system. The steps of the present invention are implemented for a plurality of user profiles and a vehicle that includes an onboard computer, a plurality of fingerprint scanners, and a plurality of vehicular controllers. The plurality of user profiles includes graphic identification data and a primary designation or a secondary designation. More specifically, the user profiles with the primary designations are granted full access to the plurality of vehicular controllers while the user profiles with the secondary designations are granted partial access to the plurality of vehicular controllers. The onboard computer includes a mobile application that wirelessly connected with a mobile device of the user profile that includes the primary designation or the secondary designation through a wireless network. The primary designation and the secondary designation are able to control various vehicle controller system through the corresponding mobile device depending upon the parameters of the present invention. The mobile device can include, but is not limited to, a smartphone, a tablet, and a personal digital assistant.

Figure 1:
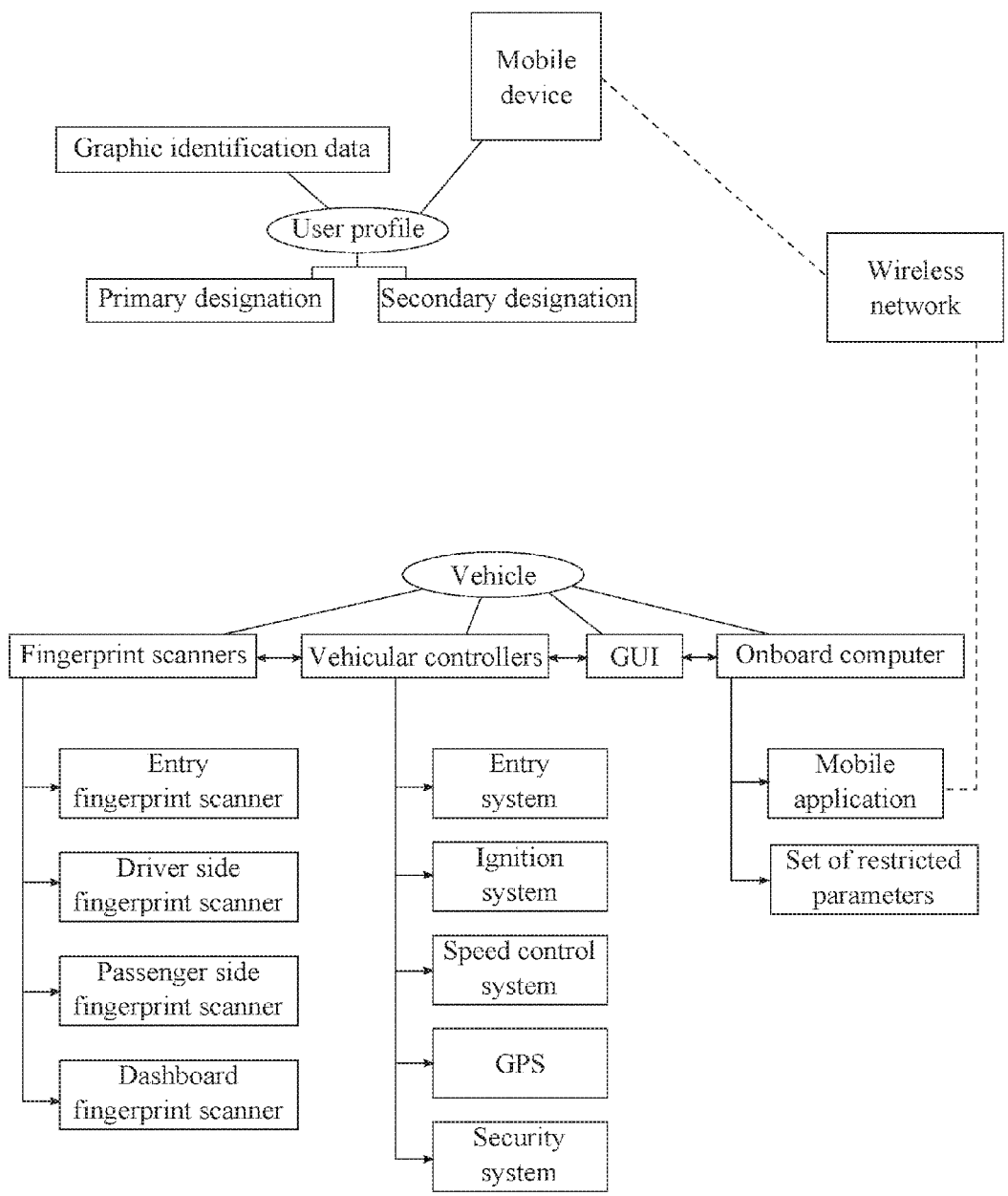
FIG. 1 is a system view of the present invention.

In reference to FIG. 1, the plurality of fingerprint scanners includes an entry fingerprint scanner, a driver side fingerprint scanner, a passenger side fingerprint scanner, and a dashboard fingerprint scanner; each fingerprint scanner is communicably coupled with at least one of the plurality of vehicular controllers. Each fingerprint scanner is a biometric device which recognizes and captures pertinent data regarding the graphic identification data, where the graphic identification data refers to a fingerprint from any finger. Each fingerprint scanner includes a fingerprint sensor that captures a digital image of the fingerprint in the form of the graphic identification data. The fingerprint sensor may be an optical sensor that comprises a phosphor layer and a charge coupled device. The charge couple device may further comprise a plurality of solid state pixels, an ultrasonic sensor that includes a piezoelectric transducer, or a capacitance sensor that includes a plurality of pixels acting as one plate of a parallel-plate capacitor.

The entry fingerprint scanner is preferably positioned adjacent to the driver-side door of the vehicle; however, the entry fingerprint scanner can be located anywhere on the exterior of the vehicle. The entry fingerprint scanner is communicably coupled with an entry system of the vehicle, where the entry system grant access to the vehicle and is recognized as one of the vehicular controllers within the present invention. The drive side fingerprint scanner and the passenger side fingerprint scanner are preferably positioned adjacent to the driver-side door and the passenger-side door, respectively. Similar to the entry fingerprint scanner, the drive side fingerprint scanner and the passenger side fingerprint scanner can be located anywhere on the exterior of the vehicle. Both the driver side fingerprint scanner and the passenger side fingerprint scanner are communicably coupled with a security system of the vehicle, where the security system actuates an alarm system and is recognized as one of the vehicular controllers within the present invention. Additionally, the driver side fingerprint scanner and the passenger side fingerprint scanner may be located within a recessed area of the respective door for protection and may be covered by protective material that does not interfere with the fingerprint sensors. The dashboard fingerprint scanner is preferably positioned near the key ignition location on the dashboard; however, the dashboard fingerprint scanner can be located anywhere in the interior of the vehicle as long as the driver is able to access the dashboard fingerprint scanner. The dashboard fingerprint scanner is communicably coupled with an ignition system, a speed control system, and a global positioning system (GPS) of the vehicle in addition to the entry system. Similar to the entry system, the ignition system, the speed control system, and the GPS are recognized as the vehicular controllers within the present invention.

The vehicle further comprises an onboard graphic user interface (GUI) that visually displays the interaction between the user profiles and the onboard computer of the present invention. The onboard GUI can include, but is not limited to, a liquid-crystal display screen with an integrated keyboard, an existing automobile display, or a touch screen with fingerprint recognition capabilities.

In reference to FIG. 1, the primary designation is set at the ownership of the vehicle. For example, the primary designation is set by a dealership during a dealer transaction or set by a previous owner during a private transaction. More specifically, the primary designation is added to the present invention through the onboard GUI upon inputting of user information, user preferences, setting information, and the graphic identification data. In reference to a dealer transaction example, the dealership holds the primary designation until the completion of the transaction. Then the dealership selects add administrator function from the onboard GUI and prompts the new owner to enter the user information, the user preferences, the setting information, and the graphic identification data through the onboard GUI. The new owner then assigned as the primary designation, where the new owner is able to delete or retain the primary designation of the dealership or change the primary designation of the dealership to the secondary designation. As a result, the new owner attains full control for the plurality of vehicular controllers. Once the primary designation is completed within the present invention, the primary designation is able to add additional primary designations and/or secondary designations through the onboard GUI. For example, the primary designation first selects add secondary administrator function from the onboard GUI. Then the primary designation scans his or her fingerprint on the dashboard fingerprint scanner, followed by the secondary driver that becomes the secondary designation. Then the secondary driver is able to enter the user information, the user preferences, the setting information, and the graphic identification data through the onboard GUI. All the related information for the primary designation and the secondary designation, which is entered through the onboard GUI, is stored within a database of the onboard computer to process the present invention.

Figure 3:
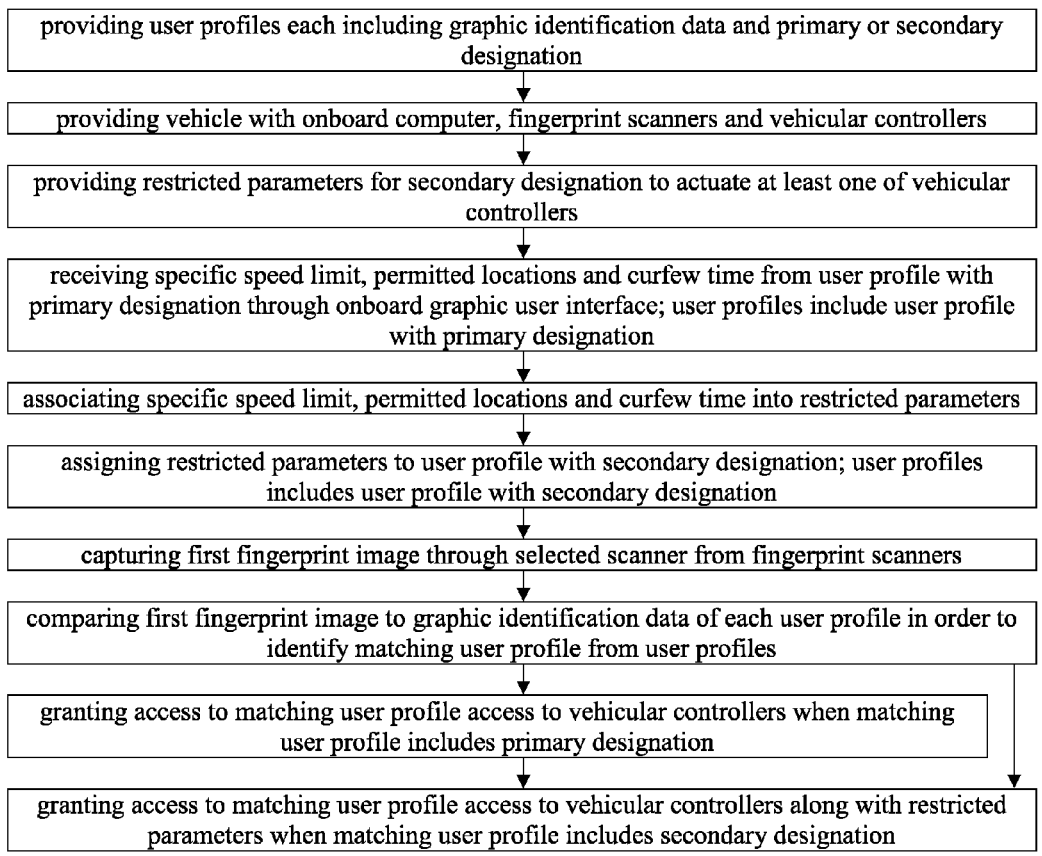
FIG. 3 is a flow chart illustrating the assignment of restricted parameter within the overall process of the present invention.

In order to differentiate the primary designation and the secondary designation within the present invention, the primary designation is able to define a set of restricted parameters for the secondary designation. In reference to FIG. 1 and FIG. 3, the set of restricted parameters is entered through the onboard GUI and stored within the database of the onboard computer so that the onboard computer is able to apply the set of restricted parameters to the secondary designation. The set of restricted parameters includes a specific speed limit, a plurality of permitted locations, and a curfew time. For example, the primary designation may define a specific time period within the curfew where the secondary designation is not allowed to access the plurality of vehicular controller. As a result, the primary designation is able to selectively limit the usage of the vehicle in relation to the secondary designation. In other words, the set of restricted parameters is actuated by at least one of the plurality of vehicular controllers from the plurality of vehicular controllers and only applied towards the secondary designation within the present invention.

Figure 2:
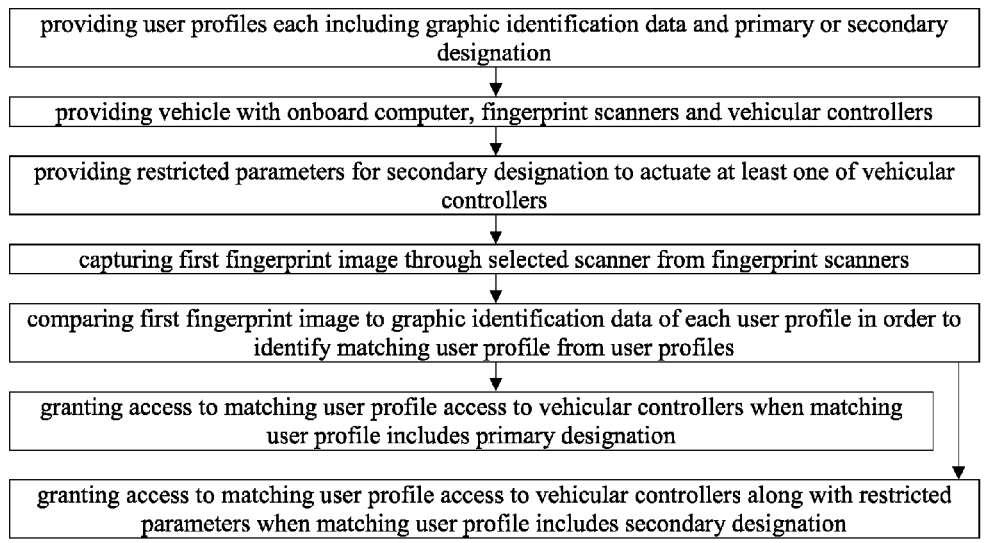
FIG. 2 is a flow chart illustrating the overall process of the present invention.

In reference to FIG. 2, a first fingerprint image needs to be captured through a selected scanner from the plurality of fingerprint scanner. The first fingerprint image, which can be the primary designation or the secondary designation, is captured and sent to the onboard computer to further conduct analysis through a fingerprint recognition algorithm. The fingerprint recognition algorithm can be a pattern-based algorithm or an image-based algorithm. The fingerprint recognition algorithm recognizes patterns and characteristics of ridges and minutia points of the first fingerprint image which generally fall within the categories of arch, loop, and whorl. The fingerprint recognition algorithm then compares the first fingerprint image to the graphic identification data of each user profile in order to identify a matching user profile as the graphic identification data is stored within the database of the onboard computer. Once the fingerprint recognition algorithm determined an identical graphic identification data to the first fingerprint image, the onboard computer is able to conclude that the matching user profile includes the primary designation or the secondary designation. More specifically, if the matching user profile includes the primary designation, the matching user profile is granted full access to the plurality of vehicular controllers. However, if the matching user profile includes the secondary designation, the matching user profile is only granted access to the plurality of vehicular controllers within the set of restricted parameters.

Figure 4:
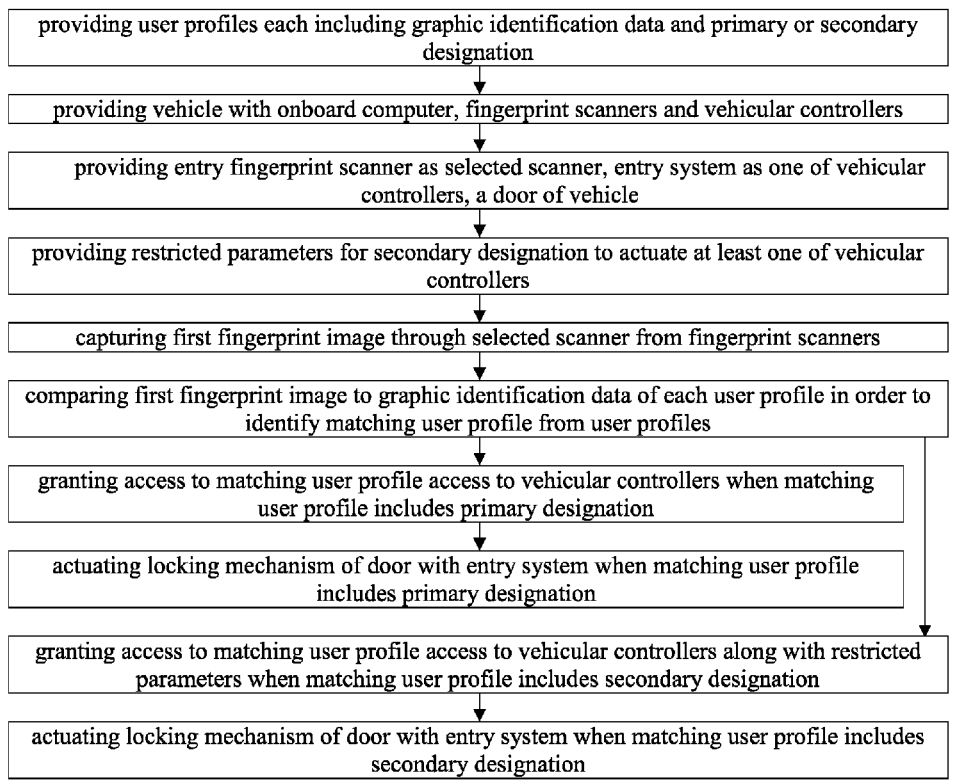
FIG. 4 is a flow chart illustrating the actuating of locking mechanism within the overall process of the present invention.

In reference to FIG. 4, when the present invention receives the first fingerprint image through the entry fingerprint scanner, the present invention determines that the entry fingerprint scanner is the selected scanner and selects the entry system as one of the vehicular controllers. The onboard computer then recognizes a locking mechanism within a door of the vehicle and actuates the locking mechanism of the door with the entry system if the matching user profile is identified. More specifically, the actuation process of the entry system can lock an unlocked door or unlock a locked door. The primary designation and the secondary designation are generally allowed to actuate the locking mechanism, unless the primary designation specifically excludes the secondary designation from the entry system. For example, when a driver places a finger on the entry fingerprint scanner, the first fingerprint image is captured by the fingerprint sensor, and analyzed by the fingerprint recognition algorithm to determine the matching user profile and the primary designation or the secondary designation of the matching user profile. Then the present invention is able to actuate the locking mechanism of the entry system to either lock or unlock the door containing the respective entry fingerprint scanner.

Figure 5:
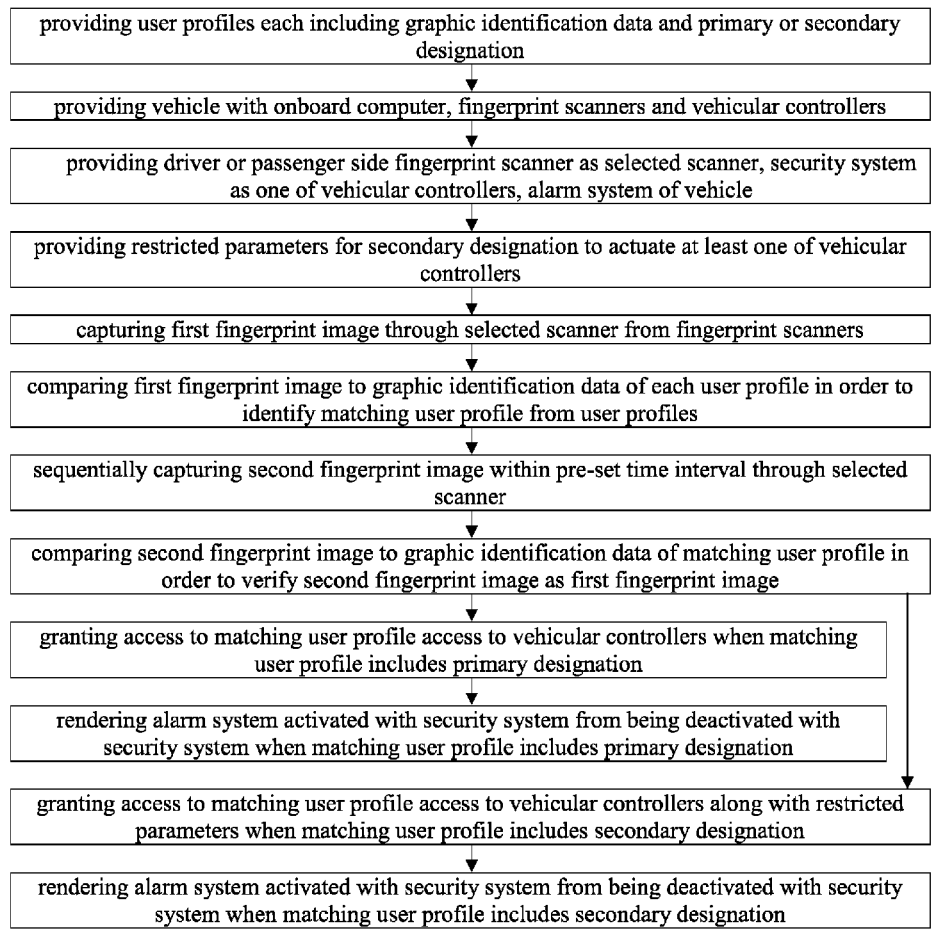
FIG. 5 is a flow chart illustrating the activation of alarm system within the overall process of the present invention.

In reference to FIG. 5, when the present invention receives the first fingerprint image through the driver side fingerprint scanner or the passenger side fingerprint scanner, the present invention determines that the driver side fingerprint scanner or the passenger side fingerprint scanner is the selected scanner and selects the security system as one of the vehicular controllers. When the present invention sequentially captures a second fingerprint image within a pre-set time interval through the selected scanner, the onboard computer recognizes the alarm system of the vehicle and determines that the alarm system is deactivated with the security system. Since the first fingerprint image is compared to the graphic identification data to identify the matching user profile, the present invention also compares the second fingerprint image to the graphic identification data of the matching user profile in order to verify the second fingerprint image as the first fingerprint image. Upon confirmation of the first fingerprint image and the second fingerprint image, the present invention activates the alarm system with the security system for both the primary designation and the secondary designation. The primary designation and the secondary designation are generally allowed to activate the alarm system, unless the primary designation specifically excludes the secondary designation from the security system. For example, when a driver sequentially places a finger on the driver side fingerprint scanner or the passenger side fingerprint scanner, the first fingerprint image and the second fingerprint image are captured by the fingerprint sensor. Then the first fingerprint image and the second fingerprint image are analyzed by the fingerprint recognition algorithm to determine the matching user profile. The present invention also determines if the matching user profile is associated with either the primary designation or the secondary designation. Then the present invention is able to select the security system to activate the alarm system since the alarm system is deactivated at the beginning of the process.

Figure 6:
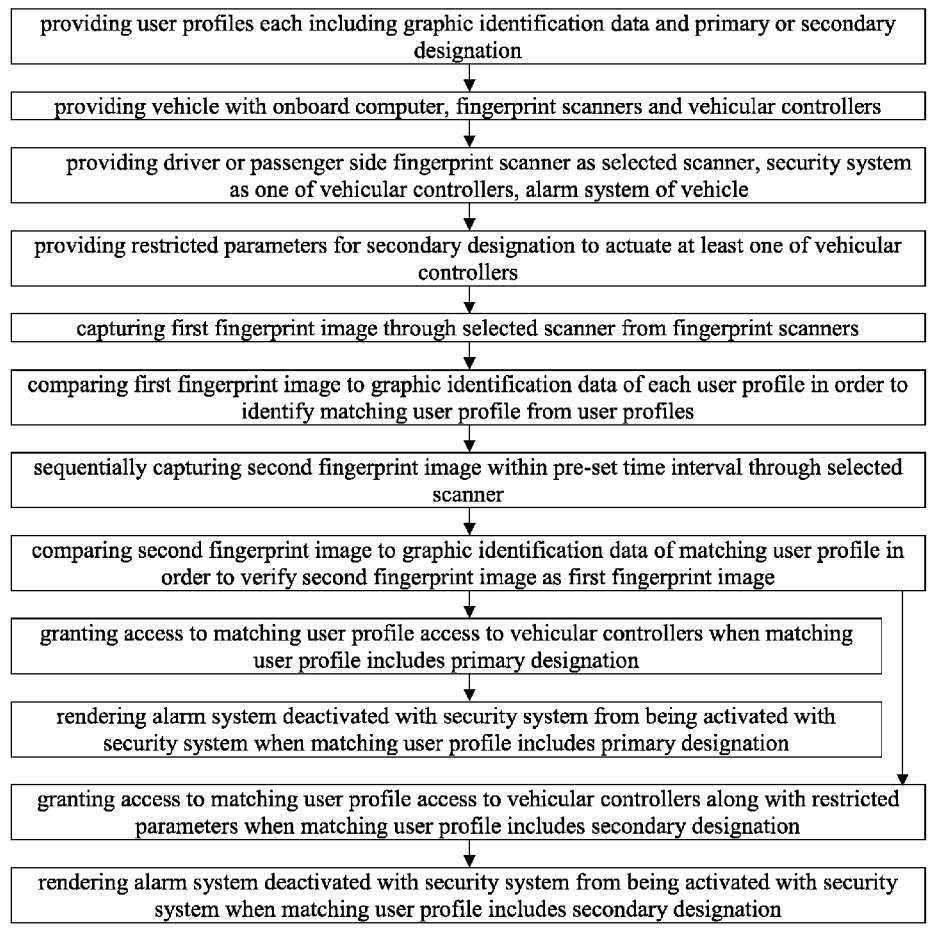
FIG. 6 is a flow chart illustrating the deactivation of alarm system within the overall process of the present invention.

In reference to FIG. 6, when the present invention receives the first fingerprint image through the driver side fingerprint scanner or the passenger side fingerprint scanner, the present invention determines that the driver side fingerprint scanner or the passenger side fingerprint scanner is the selected scanner and selects the security system as one of the vehicular controllers. When the present invention sequentially captures the second fingerprint image within the pre-set time interval through the selected scanner, then the onboard computer recognizes an alarm system of the vehicle and determines that the alarm system is activated with the security system. Since the first fingerprint image is compared to the graphic identification data to identify the matching user profile, the present invention also compares the second fingerprint image to the graphic identification data of the matching user profile in order to verify the second fingerprint image as the first fingerprint image. Upon confirmation of the first fingerprint image and the second fingerprint image, the present invention deactivates the alarm system with the security system for both the primary designation and the secondary designation. The primary designation and the secondary designation are generally allowed to deactivate the alarm system, unless the primary designation specifically excludes the secondary designation from the security system. For example, when a driver sequentially places a finger on the driver side fingerprint scanner or the passenger side fingerprint scanner, the first fingerprint image and the second fingerprint image are captured by the fingerprint sensor. Then the first fingerprint image and the second fingerprint image are analyzed by the fingerprint recognition algorithm to determine the matching user profile. The present invention also determines if the matching user profile is associated with either the primary designation or the secondary designation. Then the present invention is able to select the security system to deactivate the alarm system since the alarm system is activated at the beginning of the process.

Figure 7:
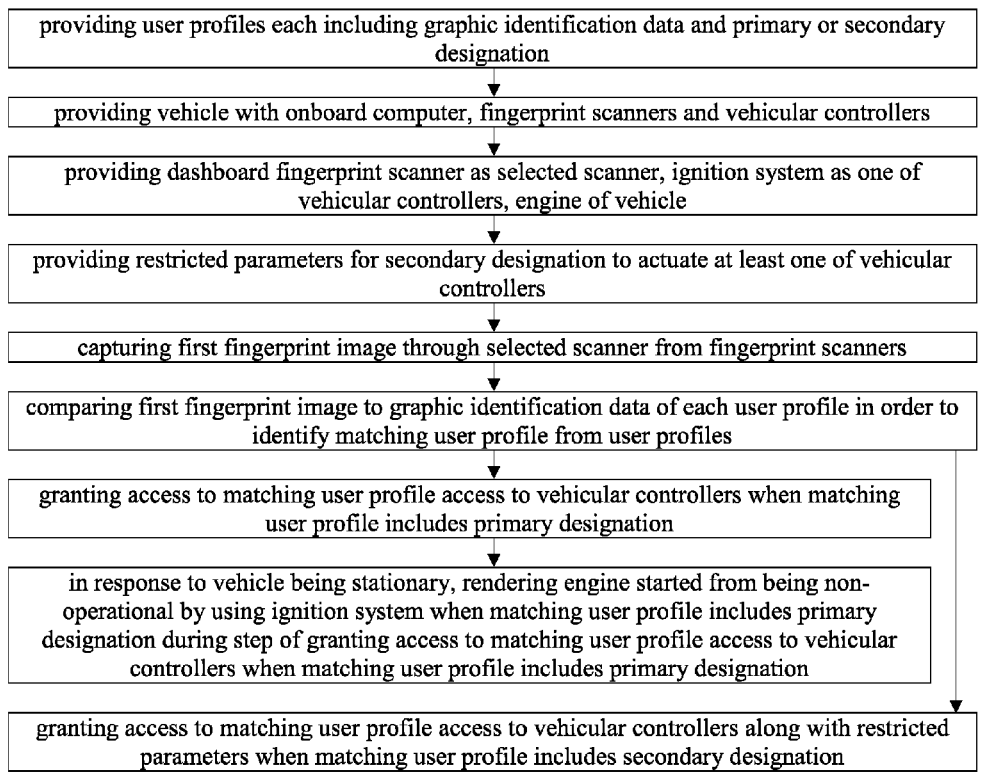
FIG. 7 is a flow chart illustrating the engine start process within the overall process of the present invention, by the primary designation.
Figure 8:
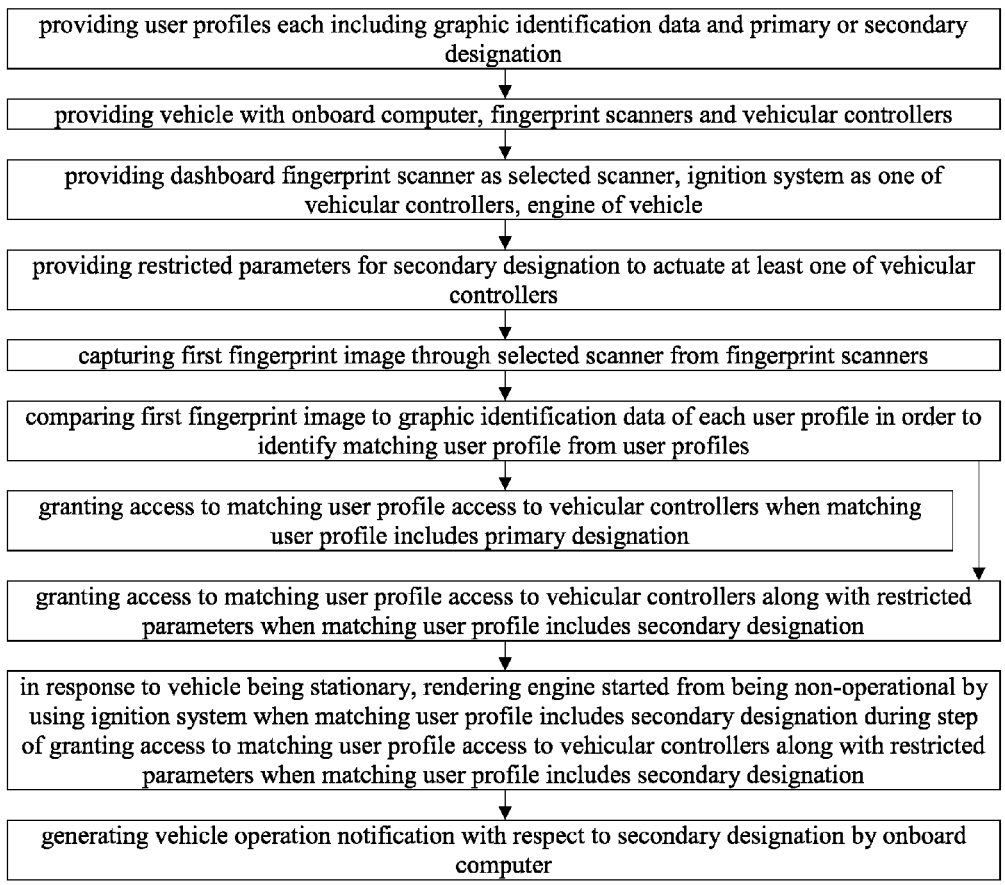
FIG. 8 is a flow chart illustrating the engine start process within the overall process of the present invention, by the secondary designation.

In reference to FIG. 7 and FIG. 8, when the present invention receives the first fingerprint image through the dashboard fingerprint scanner, the present invention determine that the dashboard fingerprint scanner is the selected scanner and selects the ignition system as one of the vehicular controllers. Since the ignition system is selected as the vehicular controller, an engine of the vehicle can be started with the ignition system by the primary designation or the secondary designation. Furthermore, when the secondary designation starts the engine with the dashboard fingerprint scanner, the onboard computer wirelessly sends a vehicle operation notification to the primary designation. The vehicle operational notification informs the primary designation that the vehicle is started by the secondary designation and is sent to the mobile device of the primary designation. For example, when a driver places a finger on the dashboard fingerprint scanner, the first fingerprint image is captured by the fingerprint sensor, and analyzed by the fingerprint recognition algorithm to determine the matching user profile and the primary designation or the secondary designation of the matching user profile. Then the present invention is able to start the engine as long as the vehicle is non-operational and stationary. In order to improve the safety of the driver and the vehicle, the ignition system only starts the vehicle if the engine is non-operational and the vehicle is stationary. For example, if an automobile is in motion and the fingerprint recognition algorithm verifies the matching user profile through the dashboard fingerprint scanner, then the ignition system does not respond.

In reference to FIG. 8, when the present invention receives the first fingerprint image through the dashboard fingerprint scanner, the present invention determines that the dashboard fingerprint scanner is the selected scanner and selects the ignition system as one of the vehicular controllers. However, if the onboard computer determines that the matching user profile includes the secondary designation, the present invention implements the set of restricted parameters to the vehicular controllers. Since the set of restricted parameters is associated with the specific speed limit, the plurality of permitted locations, and the curfew time, each parameter is individually applied to the corresponding vehicular controllers and displayed through the onboard GUI. For example, the specific speed limit, the plurality of permitted locations, and the curfew time are shown though the onboard GUI so that the driver is aware of the set of restricted parameters before starting a trip.

Figure 11:
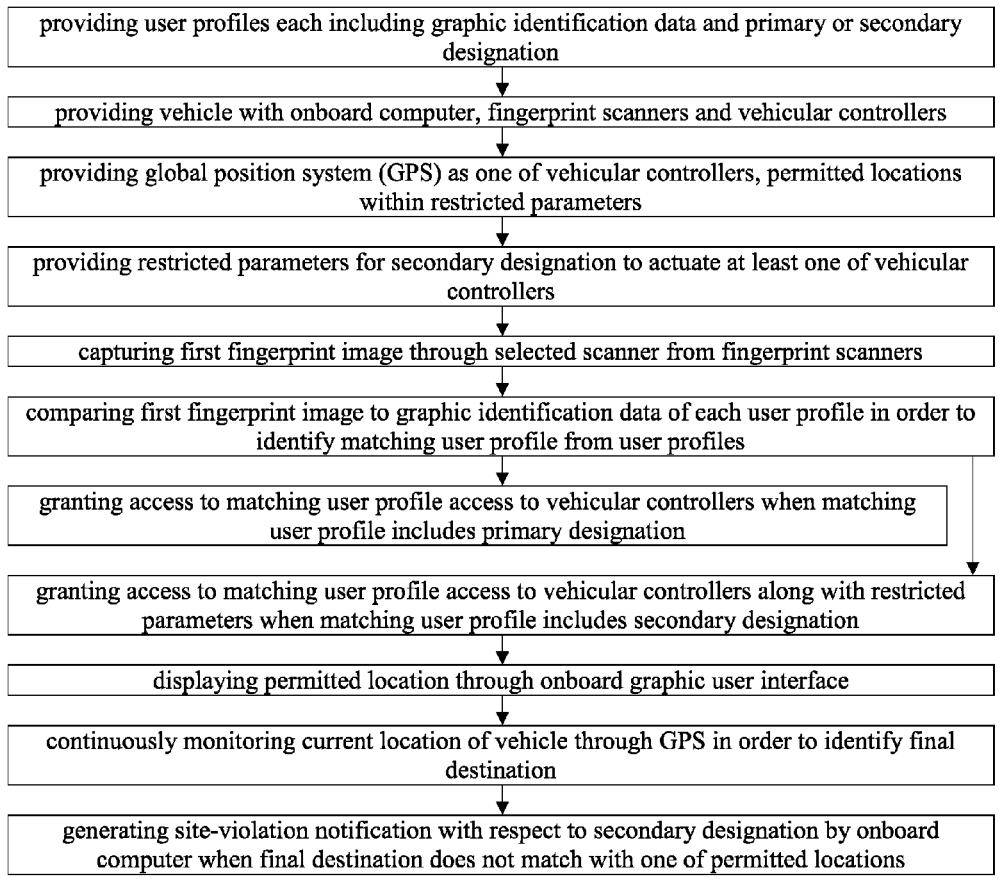
FIG. 11 is a flow chart illustrating the permitted location input for the secondary designation within the overall process of the present invention, by the secondary designation

As a result of the secondary designation which is shown in FIG. 11, the GPS continuously monitors a current location of the vehicle in order to identify or predict a final destination of the vehicle. Once the vehicle reaches to a complete stop, the GPS isolates the final destination and compares the final destination with the plurality of permitted locations. If the final destination does not match with one of the plurality of permitted locations, the onboard computer wirelessly sends a site-violation notification to the primary designation, where the site-violation notification includes the coordinates for the final destination. This allows the primary designation to monitor the whereabouts of the secondary designation and accurately locate the vehicle in the event of an emergency situation.

Figure 9:
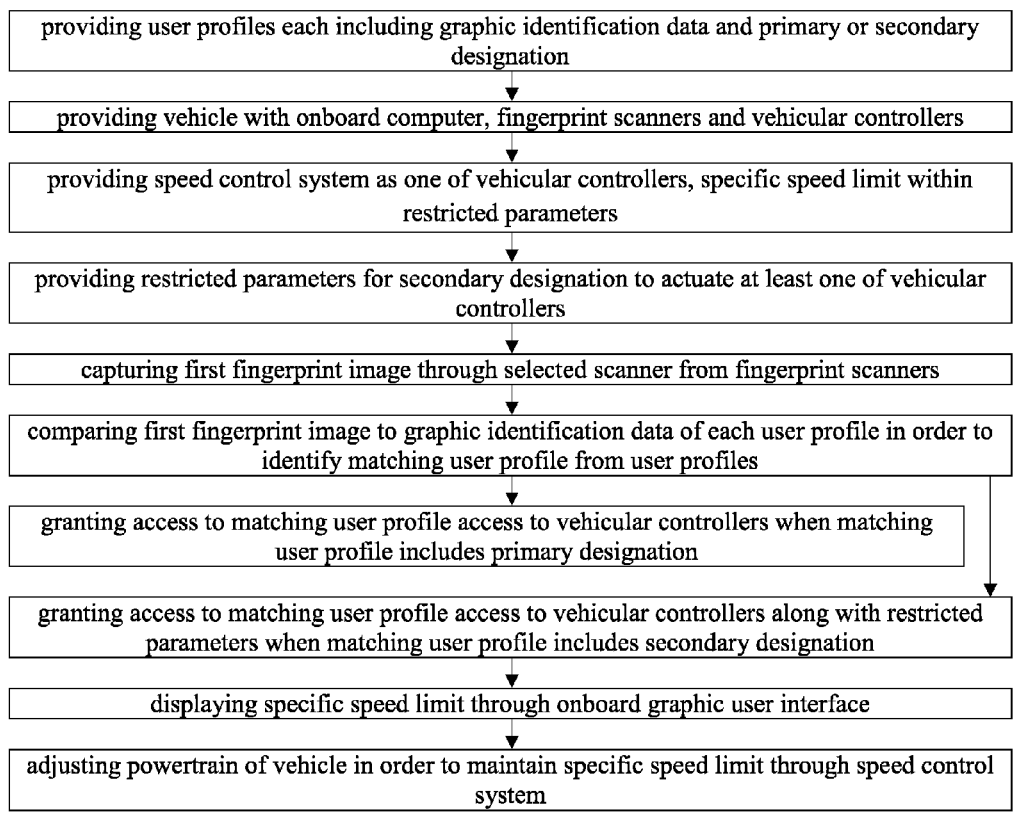
FIG. 9 is a flow chart illustrating the powertrain adjustment for the secondary designation within the overall process of the present invention, by the secondary designation.
Figure 10:
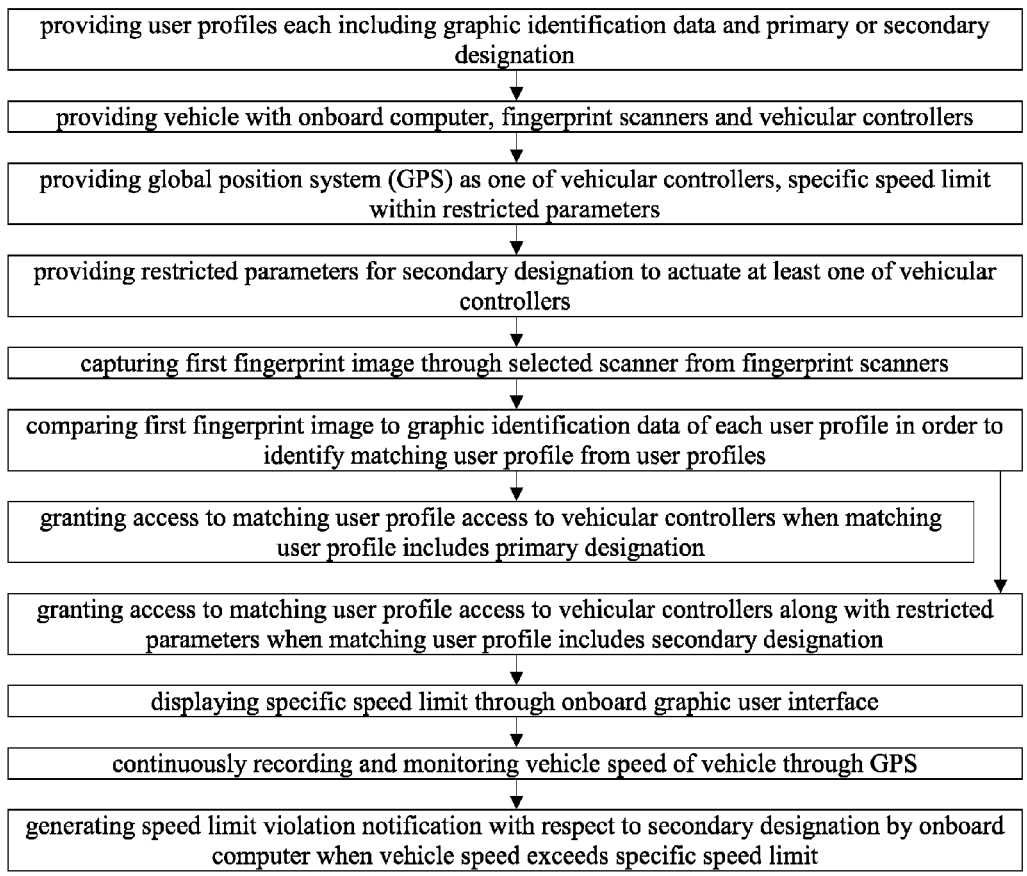
FIG. 10 is a flow chart illustrating the specific speed limit input for the secondary designation within the overall process of the present invention, by the secondary designation

Additionally, the GPS continuously records and monitors a vehicle speed of the vehicle in order to determine the driving pattern of the driver. Simultaneously, the GPS also compares the vehicle speed to the specific speed limit. If the vehicle speed excesses the specific speed limit, the onboard computer wirelessly sends a speed limit-violation notification to the primary designation as the speed limit-violation notification includes the respective vehicle speed limit as shown in FIG. 10. However, if the primary designation does not want the secondary designation to go beyond the specific speed limit, the present invention allows a powertrain of the vehicle to be adjusted through the speed control system as shown in FIG. 9. The speed control system comprises a direct regulation of throttle or fuel ignition system or a control of the speed governor. As a result, the speed control system does not permit the vehicle to drive faster than the specific speed limit set by the primary designation. The onboard GUI may also alert the driver when the vehicle is approaching or has met the specific speed time enforced by the speed control system.

Figure 12:
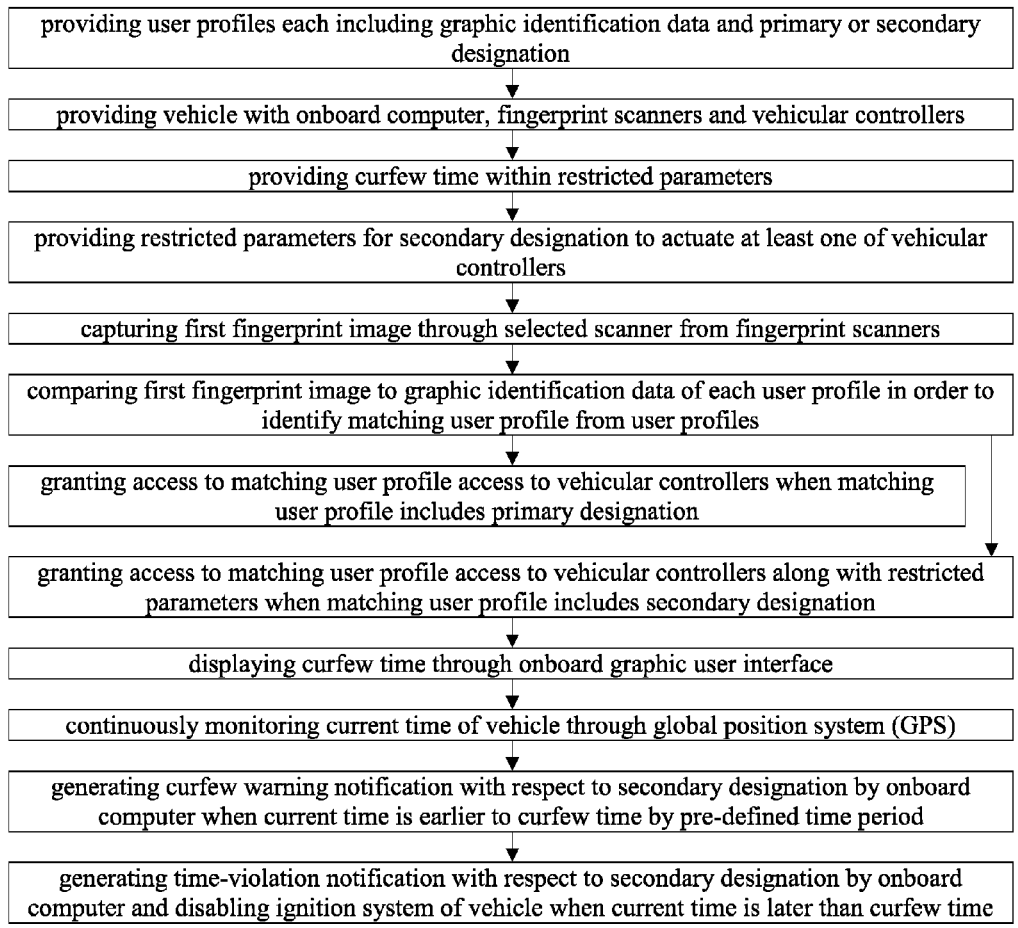
FIG. 12 is a flow chart illustrating the curfew time input for the secondary designation within the overall process of the present invention, by the secondary designation

Additionally, the GPS continuously monitors a current time of the vehicle in order to provide a warning about the curfew time as shown in FIG. 12. More specifically, if the current time is earlier than the curfew time by a pre-defined time period, the onboard computer wirelessly sends a curfew warning notification to the mobile device of the secondary designation. The total number of curfew warning notifications and the pre-defined time period can be individually defined for each secondary designations if the vehicle includes more than one secondary designation. In other words, the curfew time enables the primary designation to set limits on the ability of each secondary designation to actuate the entry system, the ignition system, the security system, the speed control system, and the GPS. For example, if the curfew time is 10 o'clock, the curfew warning notification can be sent at 9 o'clock wherein the pre-defined time period is one hour. The curfew warning notification provides sufficient time for the driver to return home so that a time-violation notification is not generated through the onboard computer. However, if the current time is later than the curfew time and the vehicle has not reached home, the onboard computer wirelessly sends the time-violation notification to the primary designation. Furthermore, the onboard computer also disables the ignition system if the vehicle is stationary. The time-violation notification includes the coordinates for the vehicle so that the primary designation is able to accurately locate the vehicle for further actions or to remotely access the plurality of vehicular controller. For example, once the time-violation notification is sent to the mobile device of the primary designation, the mobile device of the primary designation can remotely control the entry system, the ignition system, the security system, the speed control system, and curfew time. In order to accommodate emergency situations, the onboard GUI may include a curfew emergency setting in which the secondary designation may actuate the ignition system with the graphic identification data. When the curfew emergency setting is activated, a message is wirelessly sent to the mobile device of the primary designation.

Figure 13:
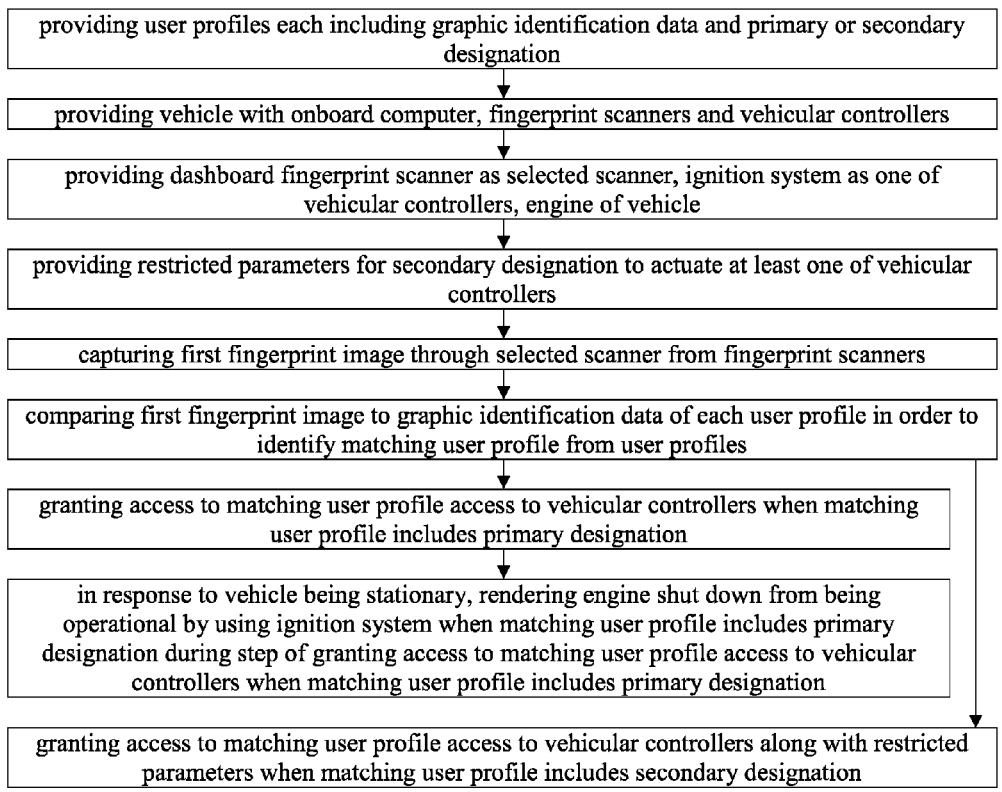
FIG. 13 is a flow chart illustrating the engine shut down process within the overall process of the present invention, by the primary designation.
Figure 14:
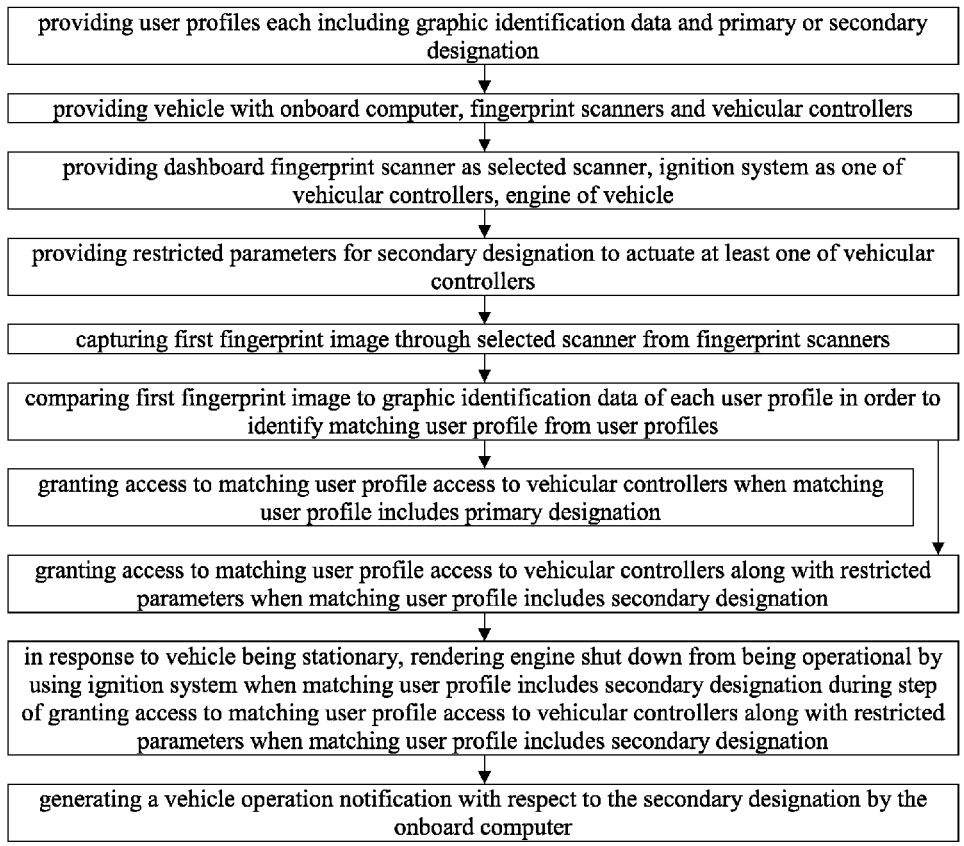
FIG. 14 is a flow chart illustrating the engine shut down process within the overall process of the present invention, by the secondary designation.

In reference to FIG. 13-14, when the present invention receives the first fingerprint image through the dashboard fingerprint scanner, the present invention determines that the dashboard fingerprint scanner is the selected scanner and selects the ignition system as one of the vehicular controllers. Since the ignition system is selected as the vehicular controller, an engine of the vehicle can be shut down with the ignition system by the primary designation or the secondary designation. Furthermore, when the secondary designation shuts down the engine with the dashboard fingerprint scanner, the onboard computer wirelessly sends the vehicle operation notification to the primary designation. The vehicle operational notification informs the primary designation that the vehicle has been shut down by the secondary designation and is sent to the mobile device of the primary designation. For example, when a driver places a finger or thumb on the dashboard fingerprint scanner, the first fingerprint image is captured by the fingerprint sensor, and analyzed by the fingerprint recognition algorithm to determine the matching user profile and the primary designation or the secondary designation of the matching user profile. Then the present invention is able to shut down the engine as long as the vehicle is operational and stationary. In order to improve the safety of the driver and the vehicle, the ignition system only shuts down the vehicle if the engine is operational and stationary. For example, if an automobile is in motion and the fingerprint recognition algorithm verifies the matching user profile through the dashboard fingerprint scanner, then the ignition system does not respond.

Figure 15:
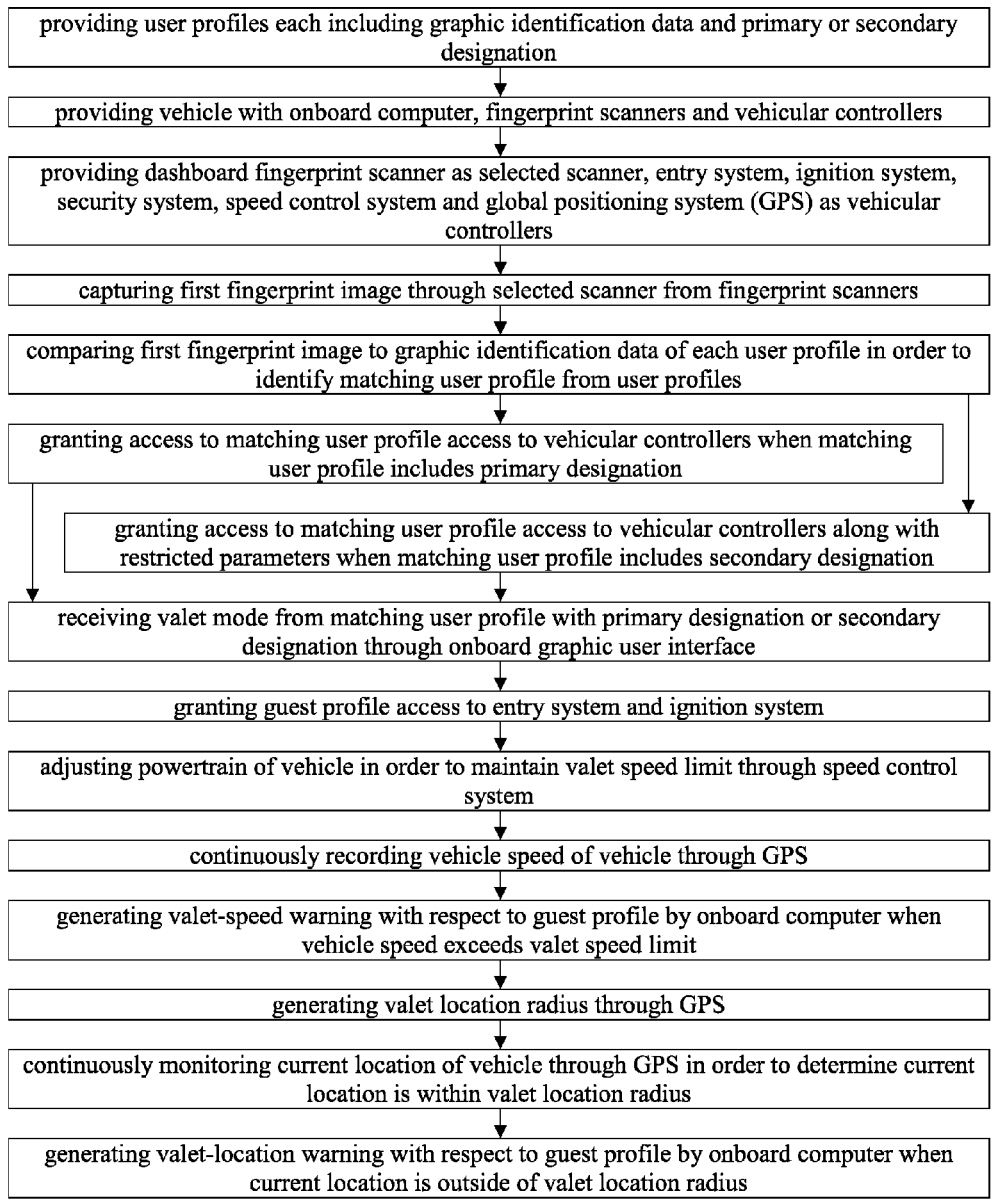
FIG. 15 is a flow chart illustrating the valet mode within the overall process of the present invention.

In reference to FIG. 15, the driver is also able to activate a valet mode through the dashboard fingerprint scanner as the valet mode can be activated through the matching user profile that includes the primary designation or the secondary designation. The valet mode enables the matching user profile to actuate the entry system, the ignition system, and the security system. More specifically, the matching user profile may specify location boundaries such as streets beyond which the automobile may not travel, speed limits, and a time limit for valet mode. Once the valet mode is received from the matching user profile through the onboard GUI, the onboard computer grants access to a guess profile of the onboard computer so that the guess profile can access the entry system. Simultaneously, the onboard computer adjusts the powertrain of the vehicle in order to maintain a valet speed limit through the speed control system and generate a valet location radius through the GPS. Then the GPS continuously records the vehicle speed of the vehicle to determine the valet speed and monitors the current location of the vehicle to determine the current location of the vehicle. If the vehicle speed excesses the valet speed limit during the valet mode, a valet-speed warning is wirelessly sent to the matching user profile. If the matching user profile includes the secondary designation, the valet-speed warning is also sent to the primary designation. The GPS also continuously monitors the current location of the vehicle to determine that the current location is within the valet location radius. If the current location of the vehicle is outside of the valet location radius, a valet-location warning is wirelessly sent to the matching user profile. If the matching user profile includes the secondary designation, the valet-speed warning is also sent to the primary designation. The onboard computer may optionally activate the alarm system of the vehicle to provide a warning for the driver of the vehicle when the current location of the vehicle is outside of the valet location radius.

To further enhance safety of features of the present invention, the present invention may further comprise a mobile-device blackout mode. When the mobile-device blackout mode is enabled, all functions that are typically performed by the mobile device such as texting and receiving calls, are routed through the onboard computer and made accessible to the driver through the onboard GUI. While the mobile-device blackout mode remains enabled, the features of the mobile device are accessible via a wireless technology standard for exchanging data over short distances connection and voice recognition means.

Although the invention has been explained in relation to its preferred embodiment, it is to be understood that many other possible modifications and variations can be made without departing from the spirit and scope of the invention as hereinafter claimed.

What is claimed is:

1. A method of managing an electronic control unit of an automobile through an integrated fingerprint recognition system by executing computer-executable instructions stored on a non-transitory computer-readable medium, the method comprising the steps of:

providing a plurality of user profiles, wherein each of the user profiles includes graphic identification data and a primary designation or a secondary designation;

providing a vehicle with an onboard computer, a plurality of fingerprint scanners, and a plurality of vehicular controllers;

providing a set of restricted parameters for the secondary designation, wherein the set of restricted parameters is used to actuate at least one of the plurality of vehicular controllers from the plurality of vehicular controllers;

capturing a first fingerprint image through a selected scanner from the plurality of fingerprint scanners;

comparing the first fingerprint image to the graphic identification data of each user profile in order to identify a matching user profile from the plurality of user profiles;

granting access to the matching user profile access to the vehicular controllers when the matching user profile includes the primary designation;

granting access to the matching user profile access to the vehicular controllers along with the set of restricted parameters when the matching user profile includes the secondary designation;

providing a driver side fingerprint scanner or a passenger side fingerprint scanner as the selected scanner;

providing a security system as one of the vehicular controllers;

providing an alarm system of the vehicle;

sequentially capturing a second fingerprint image within a pre-set time interval through the selected scanner;

comparing the second fingerprint image to the graphic identification data of the matching user profile in order to verify the second fingerprint image as the first fingerprint image;

rendering the alarm system deactivated with the security system from being activated with the security system when the matching user profile includes the primary designation;

rendering the alarm system deactivated with the security system from being activated with the security system when the matching user profile includes the secondary designation;

providing a curfew time within the set of restricted parameters;

displaying the curfew time through an onboard graphic user interface;

continuously monitoring a current time of the vehicle through a global position system (GPS);

generating a curfew warning notification with respect to the secondary designation by the onboard computer when the current time is earlier to the curfew time by a pre-defined time period; and generating a time-violation notification with respect to the secondary designation by the onboard computer and disabling an ignition system of the vehicle when the current time is later than the curfew time.

2. The method of managing an electronic control unit of an automobile through an integrated fingerprint recognition system by executing computer-executable instructions stored on a non-transitory computer-readable medium as claimed in claim 1 further comprising the steps of:

receiving a specific speed limit, a plurality of permitted locations, and the curfew time from a user profile with the primary designation through the onboard graphic user interface, wherein the plurality of user profiles includes the user profile with the primary designation;

associating the specific speed limit, the plurality of permitted locations, and the curfew time into the set of restricted parameters; and assigning the set of restricted parameters to a user profile with the secondary designation, wherein the plurality of user profiles includes the user profile with the secondary designation.

3. The method of managing an electronic control unit of an automobile through an integrated fingerprint recognition system by executing computer-executable instructions stored on a non-transitory computer-readable medium as claimed in claim 1 further comprising the steps of:

providing an entry fingerprint scanner as the selected scanner;

providing an entry system as one of the vehicular controllers;

providing a door of the vehicle;

actuating a locking mechanism of the door with the entry system when the matching user profile includes the primary designation; and actuating a locking mechanism of the door with the entry system when the matching user profile includes the secondary designation.

4. The method of managing an electronic control unit of an automobile through an integrated fingerprint recognition system by executing computer-executable instructions stored on a non-transitory computer-readable medium as claimed in claim 1 further comprising the steps of:

rendering the alarm system activated with the security system from being deactivated with the security system when the matching user profile includes the primary designation; and rendering the alarm system activated with the security system from being deactivated with the security system when the matching user profile includes the secondary designation.

5. The method of managing an electronic control unit of an automobile through an integrated fingerprint recognition system by executing computer-executable instructions stored on a non-transitory computer-readable medium as claimed in claim 1 further comprising the steps of:

providing a dashboard fingerprint scanner as the selected scanner;

providing the ignition system as one of the vehicular controllers;
providing an engine of the vehicle; and
in response to the vehicle being stationary, rendering the engine started from being non-operational by using the ignition system when the matching user profile includes the primary designation during the step of granting access to the matching user profile access to the vehicular controllers when the matching user profile includes the primary designation.

6. The method of managing an electronic control unit of an automobile through an integrated fingerprint recognition system by executing computer-executable instructions stored on a non-transitory computer-readable medium as claimed in claim 1 further comprising the steps of:
providing a dashboard fingerprint scanner as the selected scanner;
providing the ignition system as one of the vehicular controllers;
providing an engine of the vehicle;
in response to the vehicle being stationary, rendering the engine started from being non-operational by using the ignition system when the matching user profile includes the secondary designation during the step of granting access to the matching user profile access to the vehicular controllers along with the set of restricted parameters when the matching user profile includes the secondary designation; and
generating a vehicle operation notification with respect to the secondary designation by the onboard computer.

7. The method of managing an electronic control unit of an automobile through an integrated fingerprint recognition system by executing computer-executable instructions stored on a non-transitory computer-readable medium as claimed in claim 1 further comprising the steps of:
providing a speed control system as one of the vehicular controllers;
providing a specific speed limit within the set of restricted parameters;
displaying the specific speed limit through the onboard graphic user interface; and
adjusting a powertrain of the vehicle in order to maintain the specific speed limit through the speed control system.

8. The method of managing an electronic control unit of an automobile through an integrated fingerprint recognition system by executing computer-executable instructions stored on a non-transitory computer-readable medium as claimed in claim 1 further comprising the steps of:
providing the global position system (GPS) as one of the vehicular controllers;
providing a specific speed limit within the set of restricted parameters;
displaying the specific speed limit through the onboard graphic user interface;
continuously recording and monitoring a vehicle speed of the vehicle through the GPS; and
generating a speed limit violation notification with respect to the secondary designation by the onboard computer when the vehicle speed exceeds the specific speed limit.

9. The method of managing an electronic control unit of an automobile through an integrated fingerprint recognition system by executing computer-executable instructions stored on a non-transitory computer-readable medium as claimed in claim 1 further comprising the steps of:
providing the global position system (GPS) as one of the vehicular controllers;
providing plurality of permitted locations within the set of restricted parameters;
displaying the plurality of permitted location through the onboard graphic user interface;
continuously monitoring a current location of the vehicle through the GPS in order to identify a final destination; and
generating a site-violation notification with respect to the secondary designation by the onboard computer when the final destination does not match with one of the plurality of permitted locations.

10. The method of managing an electronic control unit of an automobile through an integrated fingerprint recognition system by executing computer-executable instructions stored on a non-transitory computer-readable medium as claimed in claim 1 further comprising the steps of:
providing a dashboard fingerprint scanner as the selected scanner;
providing the ignition system as one of the vehicular controllers;
providing an engine of the vehicle; and
in response to the vehicle being stationary, rendering the engine shut down from being operational by using the ignition system when the matching user profile includes the primary designation during the step of granting access to the matching user profile access to the vehicular controllers when the matching user profile includes the primary designation.

11. The method of managing an electronic control unit of an automobile through an integrated fingerprint recognition system by executing computer-executable instructions stored on a non-transitory computer-readable medium as claimed in claim 1 further comprising the steps of:
providing a dashboard fingerprint scanner as the selected scanner;
providing the ignition system as one of the vehicular controllers;
providing an engine of the vehicle;
in response to the vehicle being stationary, rendering the engine shut down from being operational by using the ignition system when the matching user profile includes the secondary designation during the step of granting access to the matching user profile access to the vehicular controllers along with the set of restricted parameters when the matching user profile includes the secondary designation; and
generating a vehicle operation notification with respect to the secondary designation by the onboard computer.

12. The method of managing an electronic control unit of an automobile through an integrated fingerprint recognition system by executing computer-executable instructions stored on a non-transitory computer-readable medium as claimed in claim 1 further comprising the steps of:
providing a dashboard fingerprint scanner as the selected scanner;
providing an entry system, the ignition system, a security system, a speed control system, and a global positioning system (GPS) as the vehicular controllers;
receiving a valet mode from the matching user profile with the primary designation or secondary designation through the onboard graphic user interface;
granting a guest profile access to the entry system and the ignition system;
adjusting a powertrain of the vehicle in order to maintain a valet speed limit through the speed control system;

continuously recording a vehicle speed of the vehicle through the GPS;
generating a valet-speed warning with respect to the guest profile by the onboard computer when the vehicle speed exceeds the valet speed limit;
generating a valet location radius through the GPS;
continuously monitoring a current location of the vehicle through the GPS in order to determine the current location is within the valet location radius; and
generating a valet-location warning with respect to the guest profile by the onboard computer when the current location is outside of the valet location radius.

\* \* \* \* \*